US 9,354,896 B1

(12) United States Patent
Yang et al.

(10) Patent No.: US 9,354,896 B1
(45) Date of Patent: May 31, 2016

(54) HYPERVISOR UTILIZATION TO REDUCE BOOTSTRAP TIME FOR DATA STORAGE SYSTEM

(71) Applicant: EMC Corporation, Hopkinton, MA (US)

(72) Inventors: Ziye Yang, Shanghai (CN); Xiaohong Qin, Saratoga, CA (US); Lintao Wan, Shanghai (CN); Steven Chen, Shanghai (CN); Xi Chen, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 190 days.

(21) Appl. No.: 14/193,963

(22) Filed: Feb. 28, 2014

(51) Int. Cl.
*G06F 9/00* (2006.01)
*G06F 9/24* (2006.01)
*G06F 13/00* (2006.01)
*G06F 9/44* (2006.01)
*G06F 9/455* (2006.01)

(52) U.S. Cl.
CPC .......... *G06F 9/4401* (2013.01); *G06F 9/45558* (2013.01)

(58) Field of Classification Search
CPC .................................................. G06F 9/4401
USPC ............................................................ 713/2
See application file for complete search history.

(56) References Cited

U.S. PATENT DOCUMENTS

| | | | |
|---|---|---|---|
| 5,497,492 A * | 3/1996 | Zbikowski et al. | 713/2 |
| 6,434,696 B1 * | 8/2002 | Kang | 713/2 |
| 7,607,000 B1 * | 10/2009 | Smith et al. | 713/1 |
| 7,778,996 B2 * | 8/2010 | Burger | 707/713 |
| 7,783,856 B2 * | 8/2010 | Hashimoto et al. | 711/173 |
| 8,131,986 B2 * | 3/2012 | Davis et al. | 713/2 |
| 8,688,965 B2 * | 4/2014 | Rothman et al. | 713/1 |
| 2002/0133695 A1 * | 9/2002 | Khatri et al. | 713/1 |
| 2004/0064686 A1 * | 4/2004 | Miller et al. | 713/1 |
| 2005/0015215 A1 * | 1/2005 | Zhang | 702/119 |
| 2014/0359266 A1 * | 12/2014 | Madhusudana et al. | 713/2 |

OTHER PUBLICATIONS

"Conventional PCI," http://en.wikipedia.org/wiki/Conventional_PCI, Feb. 27, 2014, 29 pages.
"PCI Express," http://en.wikipedia.org/wiki/PCIE, Feb. 27, 2014, 21 pages.
http://www.uefi.org/home/, Feb. 27, 2014, 3 pages.

* cited by examiner

*Primary Examiner* — Suresh Suryawanshi
(74) *Attorney, Agent, or Firm* — Ryan, Mason & Lewis, LLP

(57) ABSTRACT

A first portion of a bootstrapping process is performed for a data storage system. The first portion of the bootstrapping process comprises a hypervisor scanning for and initializing a plurality of physical storage devices of the data storage system, and storing boot information obtained during the scanning and initializing steps. A second portion of a bootstrapping process is performed for the data storage system. The second portion of the bootstrapping process comprises providing at least a portion of the stored boot information to at least one virtual machine implementing an application program that utilizes the plurality of physical storage devices, and the virtual machine initializing one or more virtual resources using the stored boot information provided by the hypervisor. The scanning for the plurality of physical storage devices of the data storage system may be performed in a parallel manner.

20 Claims, 3 Drawing Sheets

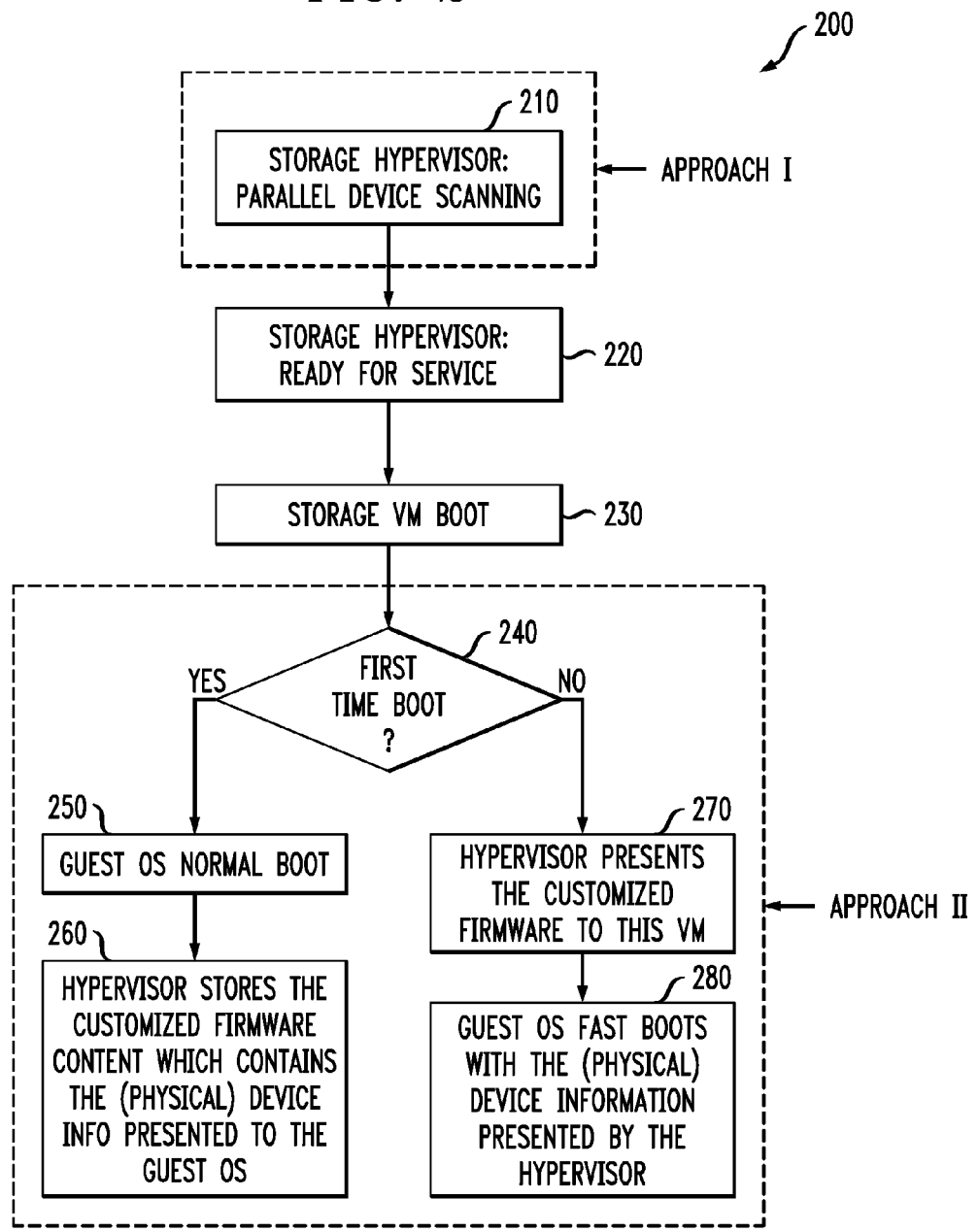

US 9,354,896 B1

HYPERVISOR UTILIZATION TO REDUCE BOOTSTRAP TIME FOR DATA STORAGE SYSTEM

FIELD

The present application relates generally to the field of data storage systems, and more particularly to techniques for reducing bootstrap time in such data storage systems.

BACKGROUND

A data storage system with a large number of hard disks is known to take a longer period of time to boot (where "boot" is short for "bootstrap") as compared with a data storage system with a smaller number of hard disks. As is known, booting or bootstrapping (or rebooting) a data storage system (or any computing system wherein software instructions are loaded and executed to control hardware components) involves, upon turning power on or a system reset, performing a power-on self-test, locating and initializing peripheral devices, and then finding, loading and booting up an operating system. Thus, a main reason that a larger storage system takes longer than a smaller storage system to boot up is due to the fact that the larger storage system needs more time to discover and initialize the extra hard disks that are peripherally connected as part of the system through some form of a system bus. Examples of such systems busses that may be used in a data storage system include, but are not limited to, a Peripheral Component Interconnect (PCI) bus or a Peripheral Component Interconnect Express (PCIe) bus.

During this bootstrapping time period, the data storage system and its underlying services, e.g., data de-duplication, are not available for data center applications and services that are utilizing the data storage system. In case such a data storage system is deployed on a critical path of certain data center applications, the unavailability of the applications and services can have severe consequences, e.g., cost overruns, violation of service level agreements, etc.

SUMMARY

Embodiments of the present invention provide techniques for reducing bootstrap time in a data storage system.

For example, in one embodiment, a method comprises the following steps. A first portion of a bootstrapping process is performed for a data storage system. The first portion of the bootstrapping process comprises a hypervisor scanning for and initializing a plurality of physical storage devices of the data storage system, and storing boot information obtained during the scanning and initializing steps. A second portion of a bootstrapping process is performed for the data storage system. The second portion of the bootstrapping process comprises providing at least a portion of the stored boot information to at least one virtual machine implementing an application program that utilizes the plurality of physical storage devices, and the virtual machine initializing one or more virtual resources using the stored boot information provided by the hypervisor. The scanning for the plurality of physical storage devices of the data storage system may be performed in a parallel manner.

Advantageously, embodiments of the invention overcome the long system boot time due to disk drive scanning, probing and initialization, by reducing the disk initialization time of a large I/O system and by maintaining high I/O performance since the large I/O system can still access the disk drives.

These and other features and advantages of the present invention will become more readily apparent from the accompanying drawings and the following detailed description.

BRIEF DESCRIPTION OF THE DRAWINGS

FIG. 2 shows a methodology for reducing bootstrap time in a data storage system in accordance with one embodiment of the invention.

DETAILED DESCRIPTION

Figure 1A:
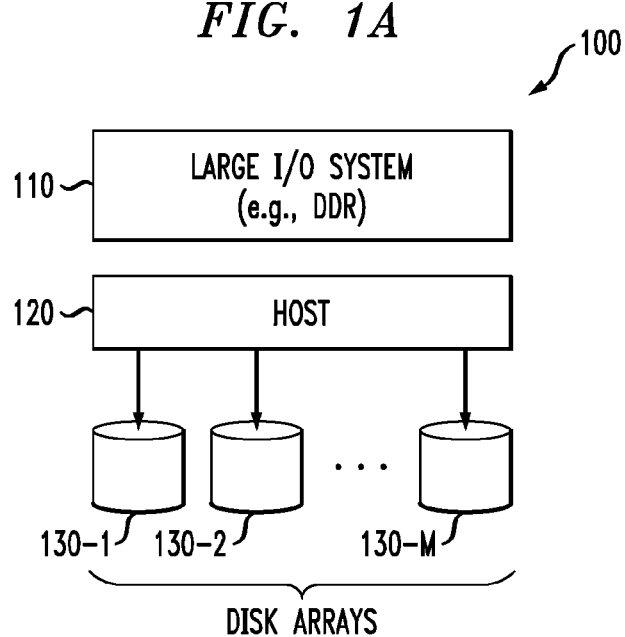
FIG. 1A shows a data storage system which exhibits a typical bootstrap time period.

The present invention will be described herein with reference to exemplary computing systems and data storage systems and associated servers, computers, storage devices and other processing devices. It is to be appreciated, however, that the invention is not restricted to use with the particular illustrative system and device configurations shown. Moreover, the phrases "computing system" and "data storage system" as used herein are intended to be broadly construed, so as to encompass, for example, private (available over a non-public network) or public (available over a public network) cloud computing or storage systems, as well as other types of systems comprising a virtual platform such as distributed virtual infrastructures. However, a given embodiment may more generally comprise any arrangement of one or more processing devices.

A virtual platform (distributed virtual infrastructure) implements the computing concept known as "virtualization." Virtualization generally allows one or more "virtual machines" (VMs) to run on a single physical machine, with each virtual machine sharing the resources of that one physical machine. Thus, virtual machines are logical processing elements that may be instantiated on one or more physical processing elements (e.g., servers, computers, processing devices). That is, a "virtual machine" generally refers to a software implementation of a machine (i.e., a computer) that executes programs in the same or similar manner as a physical machine. Thus, different virtual machines can run different operating systems and multiple applications on the same physical computer. Virtualization may be implemented by inserting a layer of software directly on the computer hardware in order to provide a virtual machine monitor or "hypervisor" that allocates hardware resources of the physical computer dynamically and transparently. The hypervisor affords the ability for multiple operating systems to run concurrently on a single physical computer and share hardware resources with each other.

An example of a commercially available hypervisor platform that may be used to implement portions of a virtual platform in one or more embodiments of the invention is the VMware vSphere® (VMware Inc. of Palo Alto, Calif.) which may have an associated virtual infrastructure management system such as the VMware vCenter®. The underlying physical infrastructure may comprise one or more distributed processing platforms that include storage products such as VNX® and Symmetrix VMAX®, both commercially available from EMC Corporation of Hopkinton, Mass. A variety of other computing and storage products may be utilized to implement a data storage system with a large number of hard disks (i.e., large input/output (I/O) requirements) that implements bootstrap timing reduction functionality and features described herein.

One example of a large data storage system is the Data Domain® Replicator (DDR) system commercially available from EMC Corporation of Hopkinton, Mass. A DDR system is typically equipped with 256 hard disks (i.e., the system may include 16 shelves with each shelf including 16 hard disks). It is known that the typical DDR system takes about 30 minutes to boot up (time period to perform the bootstrap process). The bootstrap process can be triggered by a system crash or upgrade events. If a business backup application happens to be in the middle of execution, the application can fail and terminate itself since the tolerance window (i.e., from the frontend backup software to the backend de-duplication system) is about three minutes. Therefore, it is desirable to reduce the DDR system bootstrap time to meet the backup application time out requirement.

It is realized here that most of the time in the bootstrap time period is spent on probing and initializing peripheral devices attached to system buses (e.g., PCI or PCIe). To initialize a device attached to the bus, system bootstrap firmware such as BIOS (Basic Input/Output System typically stored in non-volatile memory (e.g., NVRAM, PROM) that automatically loads and executes on power-on or system reset) first discovers the device, then an operating system (OS) is loaded from the boot disk to system memory and takes over the control of the system from the firmware. After that, the OS performs the following tasks to complete the peripheral device initialization process: (i) register and add device drivers to PCI(e) buses; (ii) register and add external buses and their attached devices (note that this is done in a sequential manner and consumes a significant amount of time); and (iii) initialize all the detected devices, i.e., map ports and memory space to CPU (central processing unit) address space.

Illustrative embodiments of the invention provide an approach to reduce bootstrap time and speed up the bootstrap process in the following areas: (i) time spent by the bootstrap firmware to detect and initialize peripheral devices; and (ii) time spent by the OS to register and initialize peripheral devices.

Figure 1B:
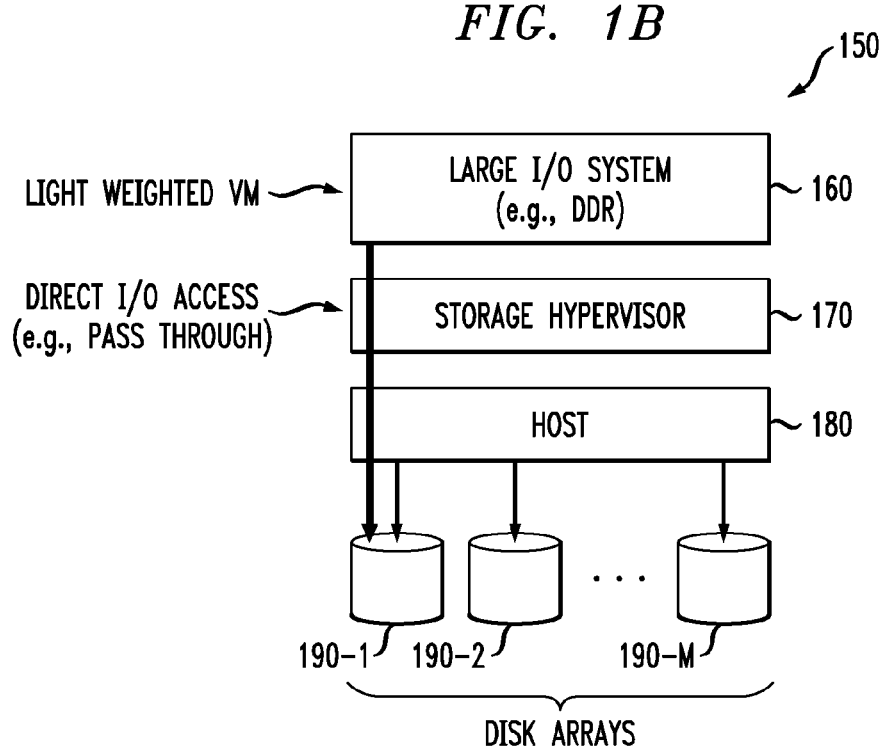
FIG. 1B shows a data storage system utilizing a customized hypervisor for reducing a bootstrap time period in accordance with one embodiment of the invention.

For example, in one illustrative embodiment, a virtual machine hypervisor and one or more virtual machines (VMs) are added to a data storage system. As shown in FIG. 1A, a typical data storage system 100 comprises a large I/O application (e.g., the DDR system mentioned above) which is executed (hosted) directly on a host computer system (host) 120. The host 120 is operatively coupled to a large set of hard disks (needed to accommodate the large I/O requirements of the DDR application), i.e., disk arrays 130-1, 130-2, . . . , 130-M. FIG. 1B illustrates an example of an adaptation (transformation) of the data storage system 100 in FIG. 1A to a storage hypervisor based system, i.e., data storage system 150, in accordance with an embodiment of the invention. In data storage system 150, the DDR application is executed inside one or more light weight virtual machines (VM) 160 which is instantiated by a storage hypervisor 170 executing on host 180, which is operatively coupled to a large set of hard disks (needed to accommodate the large I/O requirements of the DDR application), i.e., disk arrays 190-1, 190-2, . . . , 190-M. Accordingly, in accordance with this illustrative embodiment, the original physical system OS bootstrap process (implemented by system 100 in FIG. 1A) is divided into two sub bootstrap processes in system 150 of FIG. 1B: (i) bootstrap storage hypervisor; and (ii) bootstrap the VM which hosts the large storage system (DDR application). As used here, a "light weight" VM is a VM with a small footprint and restricted functions for some dedicated purpose. For example, compared with a typical VM, a light weight VM has smaller code size (e.g., kernel code, library code). Moreover, the functions of the light weight VM are already previously designated.

The storage hypervisor 170 boots up the system 150 and initializes the physical peripheral devices (disk arrays 190-1, 190-2, . . . , 190-M). Upon the completion of the bootstrap process, all the peripheral devices are managed by the hypervisor 170. These physical devices can be presented to the VM 160 as pass through devices with the assistance of the hypervisor 170. All the original storage software (e.g., DDR application) can still manipulate these physical devices as usual. When the light weight VM 160 reboots, it only needs to re-initialize the virtual resources (e.g., virtualized CPU, memory, network and disk states), but not the physical resources, as physical devices have already been initialized by the hosting hypervisor 170.

Accordingly, this illustrative embodiment overcomes the long system boot time due to disk drive scanning, probing and initialization, by reducing the disk initialization time of a large I/O system and by maintaining high I/O performance since the large I/O system can still access the disk drives.

In one embodiment, the storage hypervisor 170 is based on the concept of using a server virtualization hypervisor to run an increasingly larger portion of the storage services that are typically found in a storage array. Compared with traditional storage virtualization, there is no need to deploy new servers. The storage hypervisor 170 is not the same as a generic hypervisor that primarily focuses on I/O device management but rather can be a customized (adapted) version of such a hypervisor. The storage hypervisor 170 hosts the lightweight VM and guest OS. The "guest OS" is the application-specific operating system that is part of the DDR application in 160 of FIG. 1B, as compared with the operating system (simply referred to herein as OS) of host 180. Storage system software is executed inside the guest OS. The storage hypervisor 170 is responsible for managing the storage (I/O) resources and provisioning the virtual disks to the VMs ("virtual disks" are the virtualized logical storage units (designated by logical unit numbers or LUNs) that are created and assigned from the physical disks for use by the application being implemented in the VM). The storage hypervisor 170 can provide the physical devices to the VMs to reduce the I/O overhead via, for example, one or more of the following techniques: (i) software virtualization I/O method (e.g., pass-through); and/or (ii) hardware assisted virtualization I/O techniques, e.g., Single Root I/O Virtualization (SR-IOV), Multi Root I/O Virtualization (MR-IOV), Input/Output Memory Management Unit (IOMMU).

Transforming an existing data storage system (100 in FIG. 1A) into a hypervisor based data storage system (150 in FIG. 1B) can be accomplished in a number of ways. With a generic hypervisor and VMs, the time spent by a device scanning/probing process in a guest OS is similar to the time spent in a physical environment; typically, the guest OS does not receive any information propagated by the hosting hypervisor. However, in accordance with embodiments of the invention, we propose the following two illustrative approaches.

In a first approach (approach I), an embodiment of the invention parallelizes the device scanning process inside the storage hypervisor 170. It is to be understood that "scanning" as used herein refers to searching for and identifying devices in the system. As is known, some devices are not directly attached to the root bus (e.g., the first PCI(e) bus which connects to the north bridge), but are attached on external buses, and such a bus is connected to the root bus via a bus-bridge (e.g., south bridge). In the existing approach, a single threaded scanning manner is provided (i.e., only one CPU is utilized). Advantageously, the first approach according to an embodiment of the invention replaces the single threaded scanning approach with a parallel approach using multiple CPUs so that different external buses can be scanned in parallel. The mapping of I/O and memory space is partitioned to avoid conflicts.

In a second approach (approach II), an embodiment of the invention maintains customized firmware content and stores device states for the light weight VM. The storage hypervisor stores the states of devices when the guest OS boots up for the first time (this can be stored in volatile memory and/or non-volatile memory). For the subsequent guest OS bootstrap process, the storage hypervisor 170 utilizes the stored information and provides customized firmware content and device information directly to the guest OS. In one example, the storage hypervisor creates a snapshot of the BIOS firmware content and provides this boot information to the VM/guest OS. As such, the storage hypervisor controls the boot processing of the VM. That is, the hypervisor conducts a snapshot for the BIOS firmware in this time period, i.e., the firmware completes the detection but it does not load the operating system in the VM. Thus, for the second time boot, the system does not need to simulate the booting process of the firmware again.

FIG. 2 illustrates a methodology 200 with both boot time reduction approaches (approach I and approach II as described above) implemented. However, while it is advantageous to implement both approaches in a data storage system, it is to be appreciated that the two approaches can be implemented mutually exclusive of one another, i.e., a data storage system can implement one or the other.

As shown, in step 210, the storage hypervisor 170 performs parallel device scanning as described above (bootstrap time reduction approach I).

In step 220, the storage hypervisor 170 is ready for service following completion of step 210.

In step 230, the VM 160 boot information is stored. This boot information can be stored in volatile memory and/or non-volatile memory.

In step 240, it is determined whether this is the first time the guest OS is booting.

If this is the first system boot, then in step 250, the guest OS performs a normal (typical) boot. Then in step 260, the storage hypervisor 170 stores the (physical) device information as part of customized firmware content. This can be stored as a snapshot representation in memory (volatile or non-volatile) associated with the data storage system.

However, if this is not the first boot, then in step 270, the storage hypervisor 170 presents the customized firmware content to the VM 160. Then in step 280, the guest OS "fast" boots with the (physical) device information presented by the storage hypervisor 170. Note that steps 240 through 280 comprise the second bootstrap time reduction approach (approach II).

Accordingly, as summarized in FIG. 2, a customized hypervisor bootstraps and initializes the physical devices. A parallel process is provided to scan the devices (disks) in the bus for boot acceleration. Once the hypervisor boots up, it is ready for serving storage VMs. During the first bootstrap of the VM, the hypervisor collects and stores the firmware content and device information, which will be utilized for the next boot. When this VM reboots, the hypervisor provides the customized firmware content (e.g., BIOS content) to the guest OS in the VM to reduce the second time device probing. For example, the hypervisor can forward, to the guest OS, firmware content comprising an already-initialized ACPI (Advanced Configuration and Power Interface) table from the BIOS, thus the BIOS self-detection phase can be omitted. Moreover, for direct assigned devices, the guest OS can directly obtain the information from the hypervisor. This can be accomplished with straightforward code modifications in the guest OS.

Thus, advantageously, utilization of the storage hypervisor 170 results in significant reduction in the bootstrap time period. Recall that the BIOS typically stores all device information (e.g., memory and external devices) after the initialization Important information includes the address location of the devices in the PCI(e), and also the enabled devices for the OS. In a system with no storage hypervisor (e.g., FIG. 1A), the BIOS has to detect all the physical devices in the physical system, thus consuming a significant amount of time. When there is a storage hypervisor employed (e.g., FIG. 1B), whereby the BIOS provided to the VM is the emulated BIOS, self-check can be bypassed. That is, the hypervisor directly provides an emulated BIOS to the VM/guest OS with previously-obtained information, thus shortening the overall boot time of the data storage system.

It is to be appreciated that one or more of components of data storage system 150 in FIG. 1B may be implemented as part of private or public cloud computing or storage systems. Further, at least a subset of the elements may be collectively implemented on a common processing platform, or each such element may be implemented on a separate processing platform comprising one or more servers, computers or other processing devices.

Figure 3:
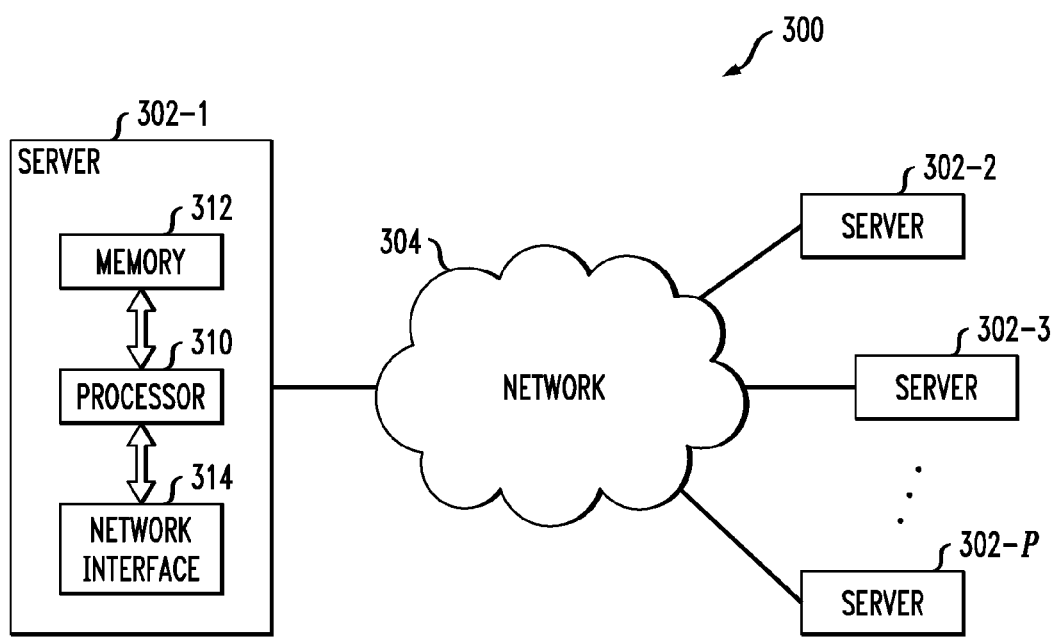
FIG. 3 shows a processing platform on which the data storage system of FIG. 1B is implemented in accordance with one embodiment of the invention.

An example of such a processing platform is processing platform 300 shown in FIG. 3. The processing platform 300 in this embodiment comprises at least a portion of the system 150 and includes a plurality of servers, denoted 302-1, 302-2, 302-3, . . . 302-P, which communicate with one another over a network 304. One or more of the components of system 150 may therefore run on a server, computer or other processing platform element (or multiple such processing platform elements), which may be viewed as an example of what is more generally referred to herein as a "processing device." As illustrated in FIG. 3, such a device generally comprises at least one processor and an associated memory, and implements one or more functional modules for controlling features of system 150. Again, multiple components may be implemented by a single processing device in a given embodiment. Alternatively, a single component may be implemented by multiple processing devices (e.g., a cluster) in a given embodiment.

The server 302-1 in the processing platform 300 comprises a processor 310 coupled to a memory 312. The processor 310 may comprise a microprocessor, a microcontroller, an application-specific integrated circuit (ASIC), a field programmable gate array (FPGA) or other type of processing circuitry, as well as portions or combinations of such circuitry elements. The memory 312 may be viewed as an example of what is more generally referred to herein as a computer program product or a non-transitory processor readable storage medium, that is at least part of an article of manufacture, having executable computer program code embodied therein. Such a memory may comprise electronic memory such as random access memory (RAM), read-only memory (ROM) or other types of memory, in any combination. The computer program code when executed by a processing device such as the server 302-1 causes the device to perform functions associated with one or more of the elements of system 150. One skilled in the art would be readily able to implement such software given the teachings provided herein. Other examples of computer program products and non-transitory processor readable storage media embodying embodiments of the invention may include, for example, optical or magnetic disks.

Also included in the server 302-1 is network interface circuitry 314, which is used to interface the server with the network 304 and other system components. Such circuitry may comprise conventional transceivers of a type well known in the art.

The other servers 302 of the processing platform 300 are assumed to be configured in a manner similar to that shown for server 302-1 in the figure.

The processing platform 300 shown in FIG. 3 may comprise additional known components such as batch processing systems, parallel processing systems, physical machines, virtual machines, virtual switches, storage volumes, etc. Again, the particular processing platform shown in the figure is presented by way of example only, and data storage system 150 may include additional or alternative processing platforms, as well as numerous distinct processing platforms in any combination.

Also, numerous other arrangements of servers, computers, storage devices or other components are possible in system 300. Such components can communicate with other elements of the system 300 over any type of network, such as a wide area network (WAN), a local area network (LAN), a satellite network, a telephony or cable network, or various portions or combinations of these and other types of networks.

Thus, as mentioned above, bootstrapping a system with a large number of devices is a timing consuming process with existing bootstrapping approaches, since both firmware (BIOS) and OS use a sequential approach to discover and initialize the devices in the bus, often resulting in a longer system bootstrap time when a system is equipped with large number of peripheral devices, e.g., disks. Additionally, the computing subsystem (e.g., CPU and memory) and the I/O subsystem are typically directly connected, thus the computing subsystem takes significant time to initialize the I/O subsystem as the I/O subsystem is always passive.

To overcome these and other drawbacks with existing bootstrapping approaches, embodiments of the invention as described herein provide for a storage hypervisor based approach to accelerate the device discovery time. Generally, storage hypervisor is provided to manage the hardware devices, and the computing subsystem which connects the external devices is implemented in one or more VMs. Thus, the I/O subsystem is always active, and rebooting the VM is performed for CPU state re-initialization. In illustrative embodiments, the customized hypervisor implements the following two methods to accelerate the bus scanning process: (i) dynamically changes the CPU resources for efficient parallel bus probing and initialization; and (ii) manipulates the BIOS used by the VM and provides the already-initialized device information to the VM for reducing the next system boot and initialization time.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
performing a first set of one or more steps of a bootstrapping process for a data storage system, wherein the first set of one or more steps of the bootstrapping process comprises a hypervisor scanning for and initializing a plurality of physical storage devices of the data storage system, and storing boot information obtained during the scanning and initializing steps; and
performing a second set of one or more steps of the bootstrapping process for the data storage system, wherein the second set of one or more steps of the bootstrapping process comprises providing at least a portion of the stored boot information to at least one virtual machine implementing an application program that utilizes the plurality of physical storage devices, and the virtual machine initializing one or more virtual resources using the stored boot information provided by the hypervisor.

2. The method of claim 1, wherein the scanning for the plurality of physical storage devices of the data storage system is performed in a parallel manner.

3. The method of claim 2, wherein the parallel scanning for the plurality of physical storage devices of the data storage system further comprises utilizing multiple processing units to scan multiple busses, associated with the data storage system, to which individual ones of the plurality of physical storage devices are connected.

4. The method of claim 1, wherein the storing of boot information obtained during the scanning and initializing steps further comprises storing the boot information in at least one of volatile memory and non-volatile memory associated with the data storage device.

5. The method of claim 1, wherein, when it is determined that the virtual machine is being bootstrapped for the first time, a guest operating system of the virtual machine performs a standard bootstrapping process.

6. The method of claim 5, wherein the hypervisor stores, in at least one of volatile memory and non-volatile memory associated with the data storage device, boot information obtained during the standard bootstrapping process performed by the guest operating system for the first time boot.

7. The method of claim 1, wherein the application program is an input/output subsystem.

8. The method of claim 1, wherein the virtual machine is a light weight virtual machine.

9. The method of claim 1, wherein the hypervisor implements a software virtualization input/output method to facilitate access of the plurality of physical storage devices by the virtual machine.

10. The method of claim 9, wherein the software virtualization input/output method comprises a pass through input/output method.

11. The method of claim 1, wherein the hypervisor implements a hardware assisted virtualization input/output method to facilitate access of the plurality of physical storage devices by the virtual machine.

12. An article of manufacture comprising a processor-readable storage medium having encoded therein executable code of one or more software programs, wherein the one or more software programs when executed by the at least one processing device implement the steps of the method of claim 1.

13. An apparatus, comprising:
a memory; and
a processor operatively coupled to the memory and configured to:
perform a first set of one or more steps of a bootstrapping process for a data storage system, wherein the first set of one or more steps of the bootstrapping process comprises a hypervisor scanning for and initializing a plurality of physical storage devices of the data storage system, and storing boot information obtained during the scanning and initializing steps; and
perform a second set of one or more steps of the bootstrapping process for the data storage system, wherein the second set of one or more steps of the bootstrapping process comprises providing at least a portion of the stored boot information to at least one virtual machine implementing an application program that utilizes the plurality of physical storage devices, and the virtual machine initializing one or more virtual resources using the stored boot information provided by the hypervisor.

14. The apparatus of claim 13, wherein the scanning for the plurality of physical storage devices of the data storage system is performed in a parallel manner.

15. The apparatus of claim 14, wherein the parallel scanning for the plurality of physical storage devices of the data storage system further comprises utilizing multiple processing units to scan multiple busses, associated with the data storage system, to which individual ones of the plurality of physical storage devices are connected.

16. The apparatus of claim 13, wherein the storing of boot information obtained during the scanning and initializing steps further comprises storing the boot information in at least one of volatile memory and non-volatile memory associated with the data storage device.

17. The apparatus of claim 13, wherein, when it is determined that the virtual machine is being bootstrapped for the first time, a guest operating system of the virtual machine performs a standard bootstrapping process.

18. The apparatus of claim 17, wherein the hypervisor stores, in at least one of volatile memory and non-volatile memory associated with the data storage device, boot information obtained during the standard bootstrapping process performed by the guest operating system for the first time boot.

19. A data storage system comprising:
a plurality of physical storage devices; and
a hypervisor;
wherein the data storage system is configured to:
perform a first set of one or more steps of a bootstrapping process, wherein the first set of one or more steps of the bootstrapping process comprises the hypervisor scanning for and initializing the plurality of physical storage devices of the data storage system, and storing boot information obtained during the scanning and initializing steps; and
perform a second set of one or more steps of the bootstrapping process, wherein the second set of one or more steps of the bootstrapping process comprises providing at least a portion of the stored boot information to at least one virtual machine implementing an application program that utilizes the plurality of physical storage devices, and the virtual machine initializing one or more virtual resources using the stored boot information provided by the hypervisor.

20. The system of claim 19, wherein the scanning for the plurality of physical storage devices of the data storage system is performed in a parallel manner.

* * * * *